Patented June 10, 1941

2,244,837

UNITED STATES PATENT OFFICE 2,244,837

PROCESS FOR HYDRATING VINYL ACETYLENE

Paul Halbig and Alfred Treibs, Munich, Germany, assignor to Consortium fur Elektrochemische Industrie, G. m. b. H., Munich, Germany, a corporation of Germany No Drawing. Application September 17, 1938, Serial No. 230,389. In Germany February 4, 1938

8 Claims. (Cl. 260—597)

This invention relates to the hydration of vinyl acetylene and has for its object to provide a new and improved process for this purpose.

We found, as disclosed in our copending application Serial No. 186,696, filed January 24, 1938, that butanol-(1)-one-(3) and $\beta,\beta'$-diketo-butyl-ether are generated by hydrating vinyl acetylene under certain conditions, i. e., by reacting vinyl acetylene with water in the presence of hydration catalysts such as mercury compounds and acids, preferably sulphuric acid.

Now we have found that these compounds as well as the previously known hydration product of the vinyl acetylene, i. e. butene-(1)-one-(3), may be produced in a particularly advantageous way if the acid content of the fluid catalyst is kept as low as possible, at all events below 10% and preferably between 0.5 and 5%. This expedient enables the butanol-(1)-one-(3) to be enriched in the reaction fluid, and the reaction efficiency of the diluted acid solution is so increased that the speed of conversion of a more concentrated acid solution is easily attained and the side reactions occurring with the use of higher acid concentrations are suppressed.

The reaction may be performed in various ways. Particularly advantageous is the continuous process in which the reaction products and the spent catalyst are continuously drawn off and the catalyst continuously renewed. The process may be performed under pressure; for example an increase of output is obtained by increasing the height of the liquid column.

The beginning of the reaction is the same as in the production of butanol-(1)-one-(3) or butene-(1)-one-(3). Vinyl acetylene is introduced into the reaction solution until the optimum efficiency of the catalyst is obtained. Of course it is also possible to introduce into the reaction vessel a catalyst solution which already contains butanol-(1)-one-(3) from a previous charge. The reaction temperature is preferably made so high that the reaction heat may be drawn off by means of the vaporized reaction liquid and a reflux condenser. Instead of butanol-(1)-one-(3) it is also possible to use butene-(1)-one-(3) or $\beta,\beta'$-diketo-butyl-ether in the catalyst solution, since these compounds form an equilibrium with butanol-(1)-one-(3) in acid aqueous solution.

If it is desired to isolate butanol-(1)-one-(3), the hydration products together with the spent reaction liquid are drawn off after reaching the desired concentration and the most favorable reaction conditions, the existence of which may be readily recognized, for instance with the aid of built-in flow meters, while care is taken by means of suitable cooling devices to avoid the escape of butene-(1)-one-(3) from the reaction system. The spent catalyst is continuously replenished, and the concentration in hydration products may be carried very high, e. g. to 70%. The $\beta,\beta'$-diketo-butyl-ether, which may be split up into butene-(1)-one-(3) quite as easily as butanol-(1)-one-(3), is generated in considerable quantities in the higher concentrations; the balance may also be shifted in favor of the butanol-(1)-one-(3) by diluting with water. Most of the spent mercury catalyst precipitates as regulas. The solution of hydration products thus obtained may be distilled after careful neutralization, and yields pure butanol-(1)-one-(3) along with $\beta,\beta'$-diketo-butyl-ether; by extraction or salting out, these products may be obtained both from neutral as well as from acid or weak alkaline solutions. Butene-(1)-one-(3) is obtained only in a small quantity.

If the solution of the hydration products drawn off continuously from the reaction system is distilled without neutralization, butene-(1)-one-(3) is obtained as the single reaction product in practically quantitative yield; the reaction solution can also be made alkaline with similar result before distillation. The catalyst solution which remains after distillation may be replenished or used again. Another variation of the reaction is that in which, after reaching the optimum output of the catalyst liquid, butene-(1)-one-(3) is distilled off as a binary mixture with water in the proportion in which butanol-(1)-one-(3) continuous to be generated.

The catalysts may be varied by additions of silver salts, iron salts, acid salts, oxidizing compounds and others which are used for instance in effecting the hydration of acetylene. The output of the catalyst solution may be increased by passing through an excess of vinyl acetylene, while unconverted vinyl acetylene is fed back into the reaction zone, for example with the aid of a blower. When using more or less impure or diluted vinyl acetylene it is advisable to try to obtain the most complete conversion possible, as the process very generally may be suited to the degree of purity of the vinyl acetylene existing at the particular time. Thus, for example, vinyl acetylene containing acetylene may be converted in such a way that the hydration products of vinyl acetylene remain in the reaction liquid, while acetaldehyde is removed from the system in the proportion in which it is generated.

The most important advantages of the process may be enumerated as follows:

(1) High efficiency of the catalyst liquid. With mercury and acid concentrations, which amount to a fraction of what has been customarily used in the past, conversions of the same or greater magnitude are attained; and the catalyst consumption is correspondingly lower.

(2) Because of the small acid and catalyst concentration, by-products such as diacetyl, unutilizable resins, etc., are formed hardly to any extent; the hydration occurs much more uniformly with almost 100% of theory.

(3) The reaction temperature may be kept higher than heretofore without the formation of by-products, e. g., when operating below atmospheric pressure almost at the boiling point of water; thereby a considerable increase in output and conversion is attained. Simultaneously therewith it is possible to carry off the reaction heat in a simple manner since the corresponding quantity of water and reaction product vaporize and after the condensation has taken place are returned wholly or partly into the reaction chamber. The reaction temperature thus remains constant automatically.

(4) Recovery of the catalyst is simplified because of the small precipitation of by-products and resin-like substances.

In the following examples the quantities are indicated in parts by weight.

*Example 1*

Vinyl acetylene is introduced into a catalyst solution comprising 18 parts by weight of mercury oxide, 21 parts by weight of concentrated sulphuric acid, and 1061 parts by weight of water, at 90° C., while care is taken to insure thorough mixture by stirring or other suitable means, and escape of the reaction products is prevented by reflux cooling. The reaction begins weakly, becoming several times stronger with the increase of the butanol-(1)-one-(3) concentration. The introduction of the vinyl acetylene may be adjusted in such a way as to yield an approximately quantitative conversion. The catalyst is usually used up with the utilization of technical vinyl acetylene when about 280 parts of vinyl acetylene are hydrated; with the use of purer vinyl acetylene substantially greater conversions may be obtained. After the exhaustion of the catalyst the mercury regulus is split off, the acid solution is carefully neutralized and subjected to vacuum distillation, which yields butanol-(1)-one-(3) and $\beta,\beta'$-diketo-butyl-ether. From a solution which contains 16% of vinyl acetylene in the form of its hydration products, about 75% of the substance is obtained as butanol-(1)-one-(3), 23% as $\beta,\beta'$-diketo-butyl-ether and 2% as butene-(1)-one-(3). The yield in hydration products amounts to 98% of theory. These products may be split up by distillation with catalytic quantities of dilute acid or basically acting substances into butene-(1)-one-(3). Butanol-(1)-one-(3)-has a boiling point of 38° C. at 0.5 mm. of mercury and a boiling point of 75° C. at 11 mm. of mercury; $\beta,\beta'$-diketo-butyl-ether has a boiling point of 82° C. at 0.5 mm. and a boiling point of 123° C. at 10.5 mm.; melting point: +6° C.

*Example 2*

The hydration of the vinyl acetylene is effected in the same manner as in Example 1. Butene-(1)-one-(3) is isolated in practically quantitative yield in hydrated form by direct distillation of the obtained acid hydrating solution; with careful fractionation it is received as a binary azeotropic mixture with water, boiling point 72.5° C. at 710 mm. This mixture of low boiling point has a content of 88% ketone. The water-free ketone is obtained by removing water with conventional drying means; still better, however— as we have found—by separating the water with the aid of organic substances resistant to solution in water, such for example as vinyl acetylene, ether, methylene chloride, pentene and similar substances and subsequent separation by distillation, so that the following method of operation, for instance, results:

100 parts of a solution containing 80 parts butene-(1)-one-(3) and 20 parts of water are mixed with 200 parts of methylene chloride, whereby two layers are formed. The lower butene-(1)-one-(3) layer containing methylene chloride is drawn off, and, after driving off the methylene chloride and a small quantity of aqueous butene-(1)-one-(3), it yields a water-free residue of pure butene-(1)-one-(3). The water-free butene-(1)-one-(3) has a boiling point of 78.5° C. at 710 mm. A certain amount of butene-(1)-one-(3) remains in the aqueous layer, which may be drawn off by washing with methylene chloride or may be enriched by distillation to the binary mixture. This shaking out may naturally be effected also as a continuous washing process in known manner.

*Example 3*

Vinyl acetylene is introduced into a watery catalyst solution which contains in 100 parts about 40 parts butanol-(1)-one-(3), 1.5 parts sulphuric acid and 0.3 part mercury oxide. This solution is kept boiling; the escape of butene-(1)-one-(3) and water is prevented by means of a reflux cooler. About 100 grams of a solution are added per litre of reaction space, said solution containing 2 grams of mercury oxide and 2.5 grams of sulphuric acid. The vinyl acetylene is so introduced that it may be converted as completely as possible. Simultaneously the reaction solution is continuously withdrawn; it contains about 40 parts of hydration products.

The reaction space may be arranged in various ways. It may, for example be subdivided so that the vinyl acetylene passes counter-current through the individual reaction chambers. The reaction product may be mixed with the additional catalyst. Temperature, quantity and concentration of catalyst, and the quantity of the introduced vinyl acetylene, may be varied. It is important to maintain the concentration of the hydration products in the reaction solution at such a level that the absorption of vinyl acetylene does not slow down. The reaction solution which is drawn off may be processed optionally according to Examples 1 or 2; it may also be subjected to catalytic hydrogenation, while in the main 1.3 butylene glycol and $\beta,\beta'$-dioxy-butyl-ether are obtained which can both be split up to butadien. In addition a small quantity of butanol-(2) is formed.

The invention claimed is:

1. Process of hydrating vinyl acetylene which comprises adding butanolone to vinyl acetylene in an acid solution of a heavy metal compound having a concentration of acid less than 10%.

2. Process of hydrating vinyl acetylene which comprises adding butanolone to vinyl acetylene in an acid solution of a heavy metal compound having a concentration of acid of 0.5% to 5%.

3. Process according to claim 1, in which the reaction heat is carried off by vaporizing the reaction liquid under refluxing conditions.

4. Process of hydrating vinyl acetylene which comprises adding butanolone to vinyl acetylene in an acid solution of a heavy metal compound having a concentration of acid less than 10% and exactly neutralizing the solution of hydration products.

5. Process of hydrating vinyl acetylene which comprises adding butanolone to vinyl acetylene in an acid solution of a heavy metal compound having a concentration of acid less than 10% and distilling the resulting reaction mixture.

6. Process of hydrating vinyl acetylene which comprising adding butanolone to vinyl acetylene in an acid solution of a mercury compound having a concentration of acid of less than 10%.

7. Process of hydrating vinyl acetylene which comprises adding butanolone to vinyl acetylene in a sulfuric acid solution of mercury oxide having a concentration of acid of less than 10%.

8. Process of hydrating vinyl acetylene which comprises adding to vinyl acetylene in an acid solution of a heavy metal compound having a concentration of acid less than 10% a substance selected from the group consisting of butanolone, butenone and $\beta,\beta'$-diketo-butyl-ether.

PAUL HALBIG.
ALFRED TREIBS.